United States Patent [19]

Owaki et al.

[11] Patent Number: 5,142,679
[45] Date of Patent: Aug. 25, 1992

[54] METHOD AND APPARATUS FOR COLLECTING EXECUTION STATUS DATA OF STRUCTURED PROGRAM

[75] Inventors: Takashi Owaki; Toshihiro Hayashi, both of Hitachi, Japan

[73] Assignee: Hitachi, Ltd., Tokyo, Japan

[21] Appl. No.: 378,504

[22] Filed: Jul. 12, 1989

Related U.S. Application Data

[63] Continuation of Ser. No. 124,381, Nov. 23, 1987, abandoned, which is a continuation of Ser. No. 819,003, Jan. 13, 1986, abandoned, which is a continuation of Ser. No. 361,438, Mar. 24, 1982, abandoned.

[30] Foreign Application Priority Data

Mar. 25, 1982 [JP] Japan .................. 56-42344

[51] Int. Cl.$^5$ .............................. G06F 9/45
[52] U.S. Cl. ..................... 395/700; 371/19; 364/DIG. 2; 364/280.4; 364/267.8
[58] Field of Search ........ 395/700; 364/280.4, 364/267.8; 371/19

[56] References Cited

U.S. PATENT DOCUMENTS 3,213,427 7/1960 Schmitt et al. .......... 364/200

OTHER PUBLICATIONS

Harwood L. D., "PL/1 Trace Program," *IBM Technical Disclosure Bulletin;* vol. 13, No. 4, Sep. 1970; pp. 855–857.
Flanagan H. W., "Program Monitoring Technique", IBM Technical Disclosure Bulletin; vol. 13, No. 8, Jan. 1971; pp. 2399–2401.
*IBM System/370 Principles of Operation*, International Business Machines Corporation, 1976—Fifth edition, pp. 39–45.
Schlaeppi H.D. et al., "Debugging System Compatible With Optimizing Compiler", *IBM Technical Disclosure Bulletin;* vol. 22, No. 6, Nov. 1979; pp. 2578–2583.
Mano M., "Computer System Architecture", Prentice-Hall Inc., 1976, pp. 184–231.
Flanagan, H. W.; "Program Monitoring Technique", *IBM Technical Disclosure Bulletin;* vol. 13, No. 8, Jan. 1971, pp. 2399–2401.
Harward, L. D.; "PL/1 Trace Program", *IBM Technical Disclosure Bulletin;* vol. 13, No. 4, Sep. 1970; pp. 855–857.
Schlaeppi, H. D. et al.; "Debugging System Compatible With Optimizing Compiler", *IBM Technical Disclosure Bulletin;* vol. 22, No. 6, Nov. 1979; pp. 2578–2583.

*Primary Examiner*—David L. Clark
*Attorney, Agent, or Firm*—Antonelli, Terry, Stout & Kraus

[57] ABSTRACT

Method and apparatus provide for collecting execution status data in the execution of an object program. In compiling a source program described in a structured format to an object program, a PROBE instruction for starting a data collecting program for collecting the execution status data, with a block identification number in an operand field thereof, is inserted at a position of an exit sentence indicating an exit of the program block. When the PROBE instruction is registered in an instruction execution register of an execution unit during a period of the execution of the object program, the data collecting program is started to collect the execution status data, which is then stored in a store table.

9 Claims, 12 Drawing Sheets

FIG. 1
(A) 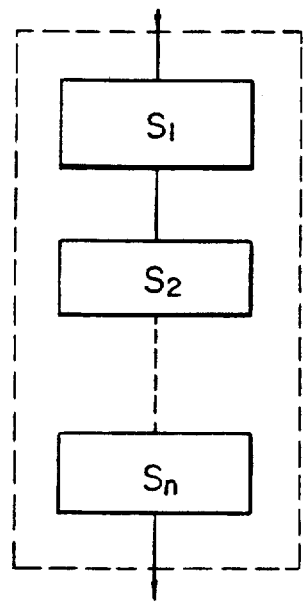
(B) 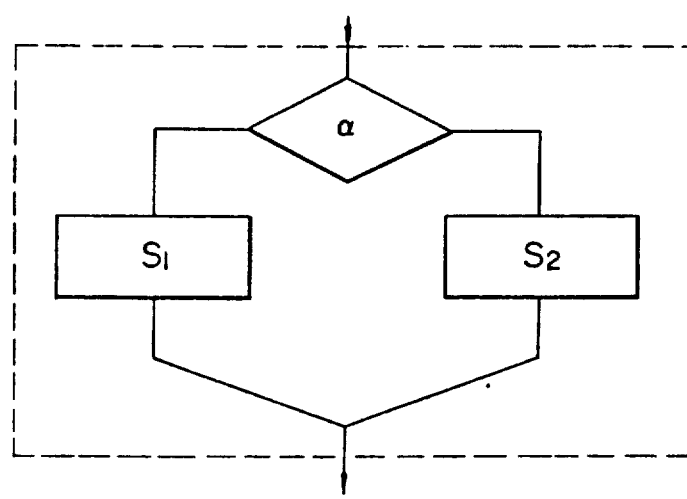
(C) 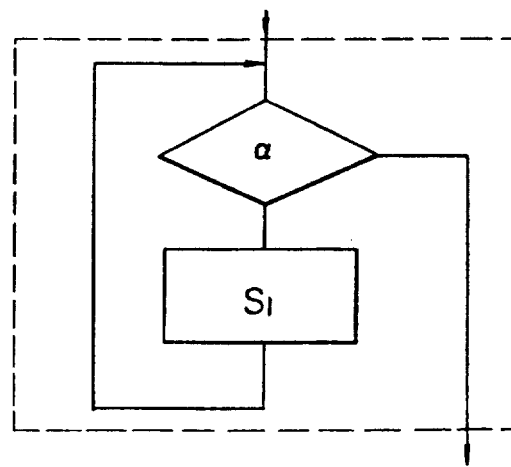

FIG. 4
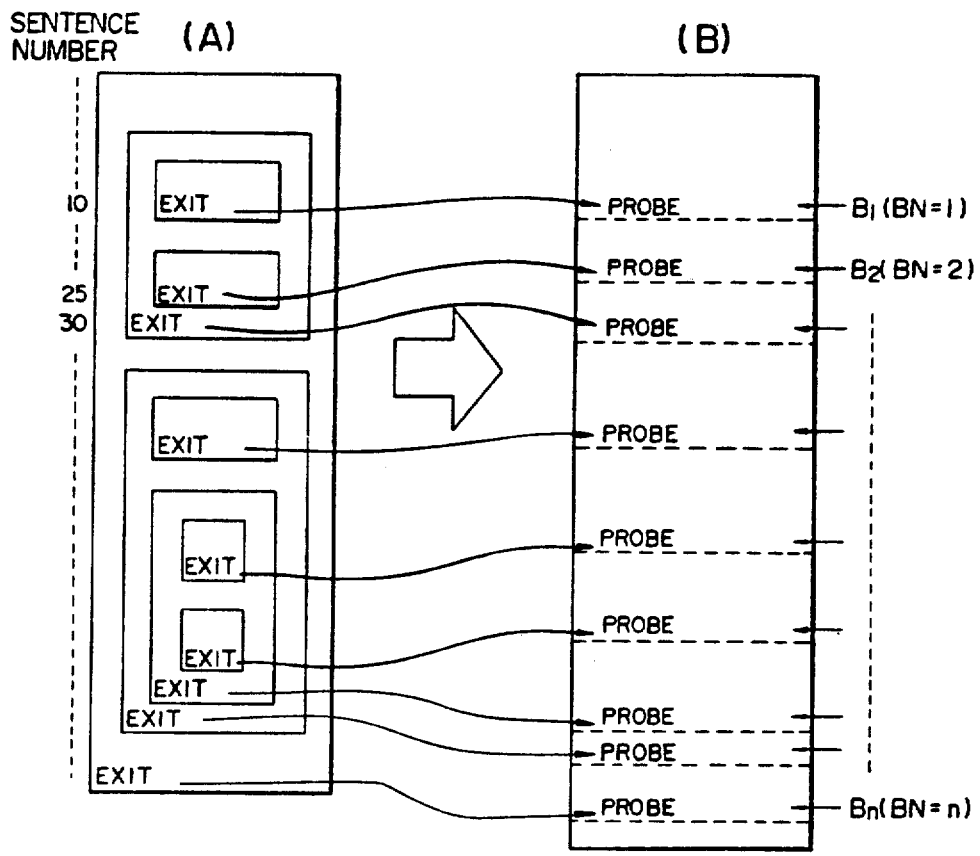
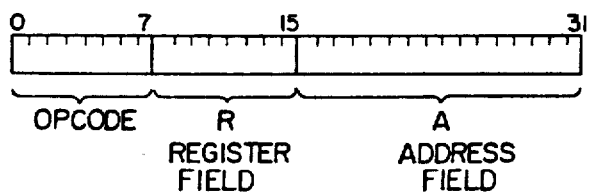
FIG. 5A
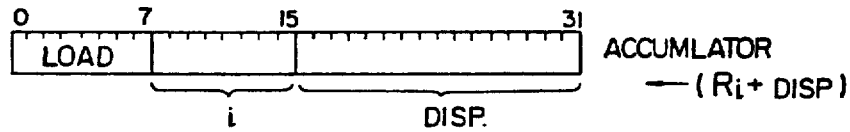
FIG. 5B
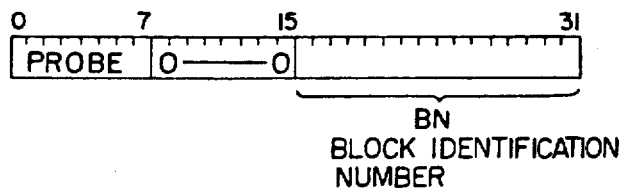
FIG. 5C

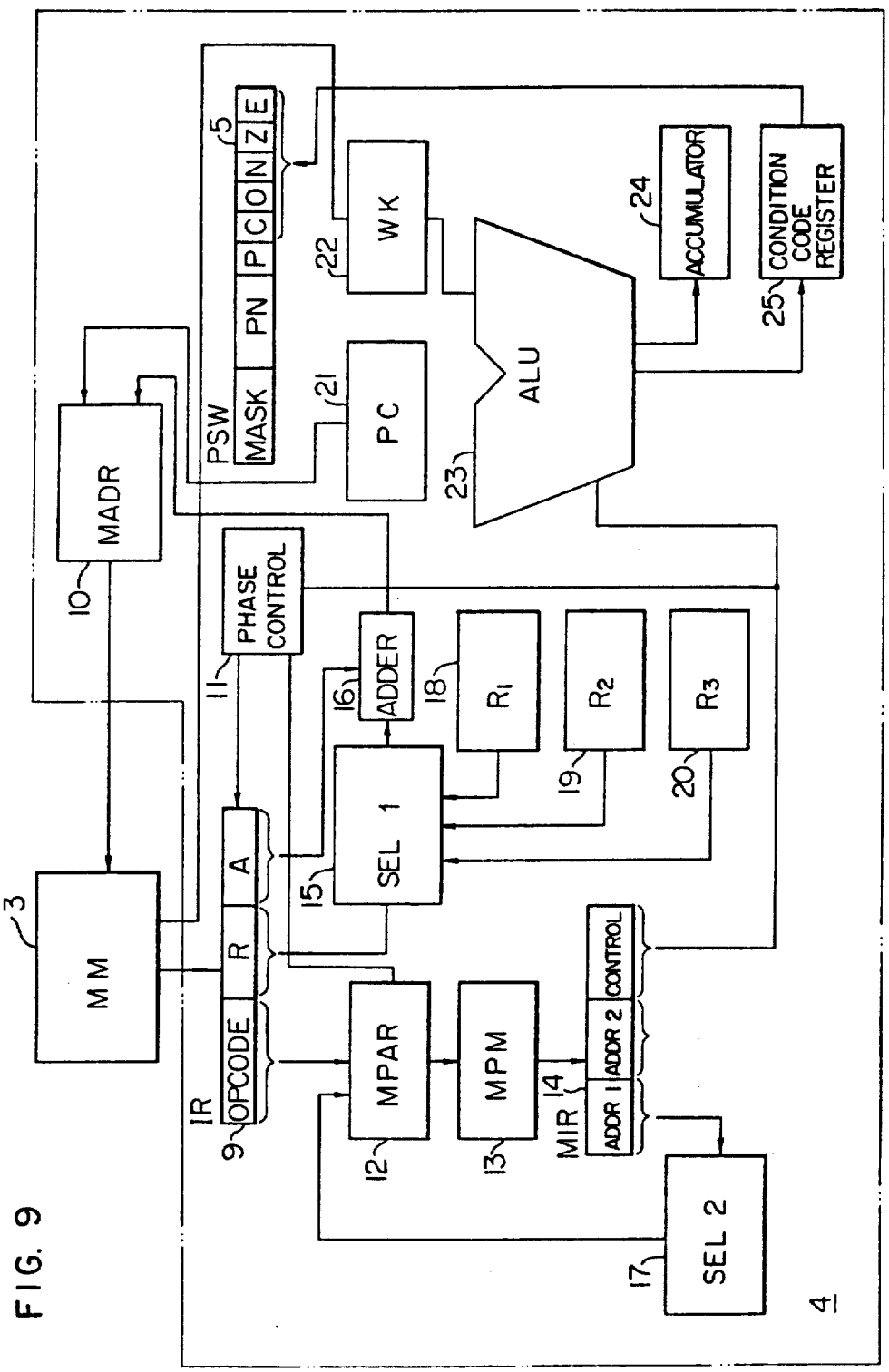

PSW

PBN

FIG. 15B

```
PROCEDURE  PO ;
IF    X ≧ O
    THEN                                    ,-P1
    ┌─────────────────────────────────┐
    │ DO   FOR   I = 1    TO 100      │
    │  A(I) = C(I)                    │
    │  END                            │
    └─────────────────────────────────┘
    ELSE                                    ,-P2
    ┌─────────────────────────────────┐
    │ DO   FOR   I = 1    TO 100      │
    │  A(I) = B(I)                    │
    │  END                            │
    └─────────────────────────────────┘
    END
    STOP
    END     PO
```

FIG. 17

```
        START
        LOAD     X
        JUMP     -,L2         ,-P1
    ┌───────────────────────────┐
    │   LOAD     =100           │
    │   STORE    J              │
    │   LOAD     =1             │
    │   STORE    I              │
    │L1 LOAD     B(I)           │
    │   STORE    A(I)           │
    │   MODIFY   I,+1           │
    │   MODIFY   J,-1           │
    │   LOAD     J              │
    │   JUMP     +,L1           │
    │   PROBE    P1             │    % TRACE EXECUTION OF BLOCK P1
    └───────────────────────────┘
        JUMP     +-0,L4        ,-P2
    ┌───────────────────────────┐
    │L2 LOAD     =100           │
    │   STORE    J              │
    │   LOAD     =1             │
    │   STORE    I              │
    │L3 LOAD     C(I)           │
    │   STORE    A(I)           │
    │   MODIFY   I,+1           │
    │   MODIFY   J,-1           │
    │   LOAD     J              │
    │   JUMP     +,L3           │
    │   PROBE    P2             │    % TRACE EXECUTION OF BLOCK P2
    └───────────────────────────┘
        JUMP     +-0,L4
    L4  PROBE    PO                   % TRACE EXECUTION OF BLOCK PO
        STOP
        END
```

METHOD AND APPARATUS FOR COLLECTING EXECUTION STATUS DATA OF STRUCTURED PROGRAM

This application is a continuation application of Ser. No. 07/124,381, filed Nov. 23, 1987 now abandoned, which is a continuation of application Ser. No. 06/819,003, filed Jan. 13, 1986 now abandoned, which is a continuation of application Ser. No. 06/361,438, filed Mar. 24, 1982 now abandoned.

BACKGROUND OF THE INVENTION

1. Field of the Invention

The present invention relates to a method and apparatus for collecting execution status data of a structured program.

2. Description of the Prior Art

In processing data in an electronic computer, a program for controlling execution of the process is essential. In developing the program, a high reliability of the program per se is required. As a measure for such reliability, a test result for the program may be a prime evaluation criterion. In testing the program, not only the volume of the program data, but also the ability to execute all potential executable paths of the program and the ability to provide correct data processing under all potential conditions are important factors. In such a program test, means for analyzing the execution status of the program is important. In program debugging, the execution paths of the program are traced in order to investigate a bug in the program. In this case, too, means for tracing the execution status of the program is important.

On the other hand, in accordance with a recent computer programming technique, a structured programming method has been proposed, in which a program is divided into blocks of a data processing unit and a plurality of such blocks are combined to form a program. The U.S. Pat. No. 4,240,137 discloses a control method and apparatus for such a structured programming.

SUMMARY OF THE INVENTION

It is an object of the present invention to provide a method and apparatus for collecting execution status data of a structured program.

It is another object of the present invention to provide a method and apparatus for efficiently collecting execution status data of the structured program.

It is a further object of the present invention to provide a method and apparatus for collecting execution status data of the structured program with a simple construction.

In accordance with one aspect of the present invention, a machine instruction (PROBE instruction) for detecting each boundary of a plurality of program blocks of the structured program is inserted at each block boundary, and a program for collecting the execution status data of the structured program is started by the PROBE instruction during a period of the execution of an object program and the collected execution status data is stored in a table.

BRIEF DESCRIPTION OF THE DRAWINGS

FIG. 1 shows flow charts of structured programming chart blocks divided in accordance with structure programming.

FIGS. 2A, 2B, 3A, 3B, 4A and 4B show charts for illustrating the operation of the present invention, in which A shows a source program and B shows a corresponding object program.

FIGS. 5A to 5C show instruction word formats.

FIGS. 9 and 10 show block diagrams of functional structures of a processing unit.

FIG. 15B illustrates construction of a program in accordance with the flow chart of FIG. 15A.

FIG. 17 shows the object program of FIG. 16 having a PROBE instruction inserted therein.

DESCRIPTION OF THE PREFERRED EMBODIMENT

Referring to FIG. 1, structure programming chart blocks (hereinafter, refer to as a program block) of three different flow charts are shown therein. (A) shows a flow chart of the SEQUENCE type, (B) a flow chart of IF α THEN $S_1$ ELSE $S_2$ type, and (C) a flow chart of DO $S_1$ WHILE α type, respectively. A source program is constituted by combining those program blocks in accordance with structure programming.

Figure 3B:
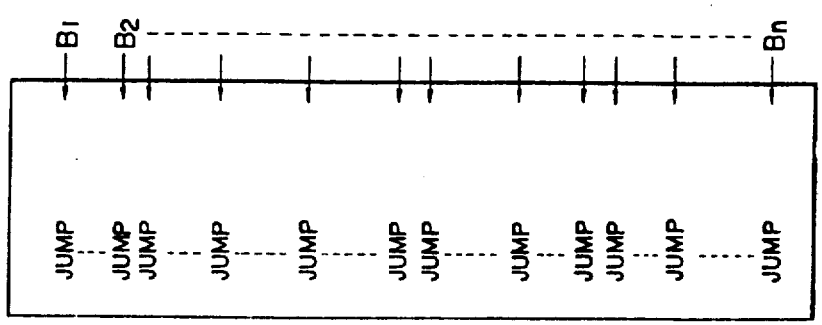
Figure 3A:
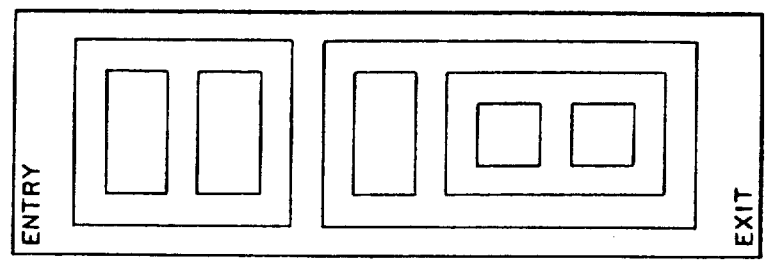
Figure 2B:
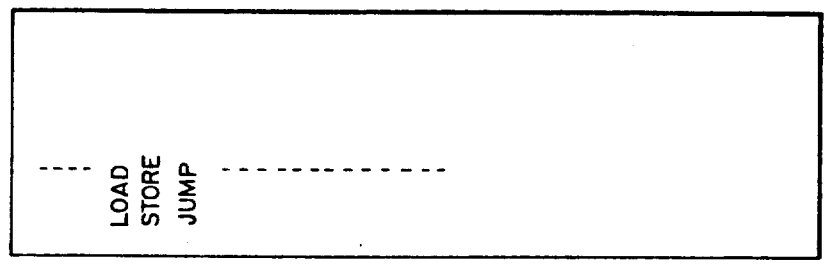
Figure 2A:
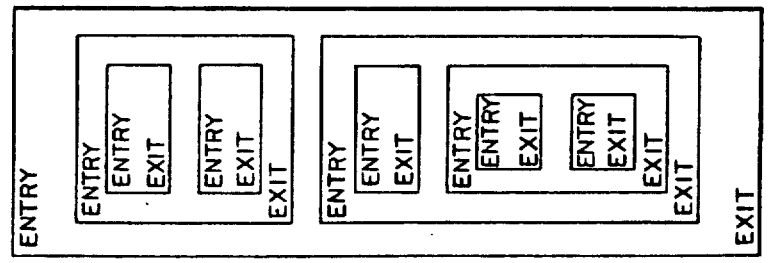

In constructing the structured program, a structured language is used. A statement representing an entry to a block in the structured language (which corresponds to the "BEGIN" or "PROCEDURE" command word in the PL/1 or PASCAL language) is called an entry sentence, and a statement representing a corresponding exit of the block (e.g. "END") is called an exit sentence. Thus, the format of the structured program is represented as shown in FIG. 2A. An object program which can be executed for the source program of FIG. 2A is shown in FIG. 2B. In order to collect the execution data of such a program, it is necessary to establish a break point for collection in the program. To this end, a branch instruction (JUMP instruction) may be used as a break point ($B_1$-$B_n$) to establish a probe point as shown in FIGS. 3A and 3B. However, in this method, a series of steps for collecting the execution status data are carried out for each JUMP instruction during a period of execution of the program and the overhead for the intended processing increases significantly. Furthermore, the analysis of the execution status based on the collected data is difficult to attain. Accordingly, the start point (entry) or the end point (exit) of each block of the structured program in accordance with the structured programming (block being a unit for data processing) is selected as a break point and the probe is established thereat.

However, it is very difficult to locate the start point (or the end point) in the block of the source program from the object program.

In a preferred embodiment of the present invention, in order to solve the difficulty in locating the block of the source program from the object program, if an entry sentence or an exit sentence appears while the source program is being compiled to the object program by the compiler, that point is automatically recognized as a break point and a probe is set at that point. As schematically shown in FIG. 4, in compiling the source program [(A) of FIG. 4] described as a structured program, a probe is set and inserted at each block boundary (break) point [(B) of FIG. 4]. The term "probe" herein used means a machine language code or a machine instruction which causes an interrupt to indicate the break point of the block during a period of the execution of the object program [(B) of FIG. 4].

FIG. 5 shows examples of the machine language codes which are machine instructions. FIG. 5A shows a format of an ordinary machine instruction. An operation code for specifying an operation is set in an OP-CODE field (bits 0-7), and a first and a second operand are set in an R (register) and an A (address) field, respectively. The operands may be addresses or binary data. FIG. 5B shows the format of a LOAD instruction. The R field specifies a register and the A field contains an address (displacement) for which the LOAD instruction is to be executed. FIG. 5C shows the format of the PROBE instruction. The OPCODE field contains a special instruction code "PROBE" and the operand contains a block identification number for identifying the block of the source program. The PROBE instruction is inserted in the object program by the compiler when the source program is compiled by the compiler unit.

Figure 6:
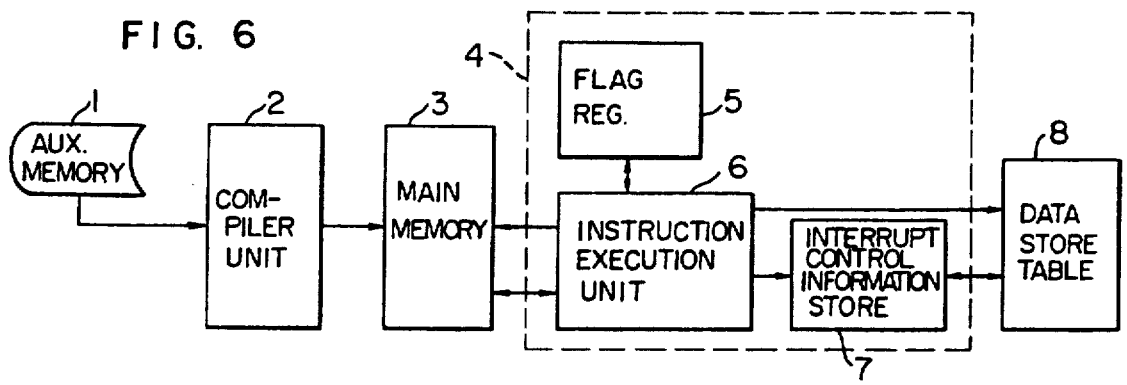
FIG. 6 shows an overall configuration of a preferred embodiment of the present invention.

FIG. 6 shows an overall block diagram of one embodiment of the present invention. Numeral 1 denotes an auxiliary memory in which the source program described as a structured program is stored. Numeral 2 denotes a compiler unit which reads in the source program and compiles it to an object program which can be executed by a processing unit 4. Numeral 3 denotes a main memory in which the object program compiled by the compiler unit 2 is stored. A PROBE instruction is inserted in the object program for each break point of the blocks of the source program. Numeral 4 generally denotes the processing unit which comprises elements 5-7. Numeral 5 denotes a flag register for storing therein a flag (program status word: PSW) which indicates a program status, numeral 6 denotes an instruction execution unit and numeral 7 denotes an interrupt control information store. Numeral 8 denotes a data store table for storing therein program execution status data. The object program compiled by the compiler unit 2 is loaded into the main memory 3, and the program is executed by the instruction execution unit 6. When the PROBE instruction appears during a period of the execution of the program, the block identification number contained in the operand of the PROBE instruction is stored in the interrupt control information store 7 and the execution jumps to the start point (previously stored in the main storage 3) of the data collecting program for collecting the program execution status data. The data collecting program is executed by the instruction execution unit 6, which stores the block identification information stored in the store 7 into the data store table 8. As the store operation ends, the execution of the PROBE instruction terminates and the next step of the object program is executed. The collection of the program execution status data is repeated for each appearance of the PROBE instruction. Accordingly, at the end of a series of executions of the object program, the execution status data has been stored in the data store table 8 so that the trace and the analysis of the execution paths are made possible.

Further details of the embodiment of FIG. 6 will be explained with reference to FIGS. 7-14.

Figure 7:
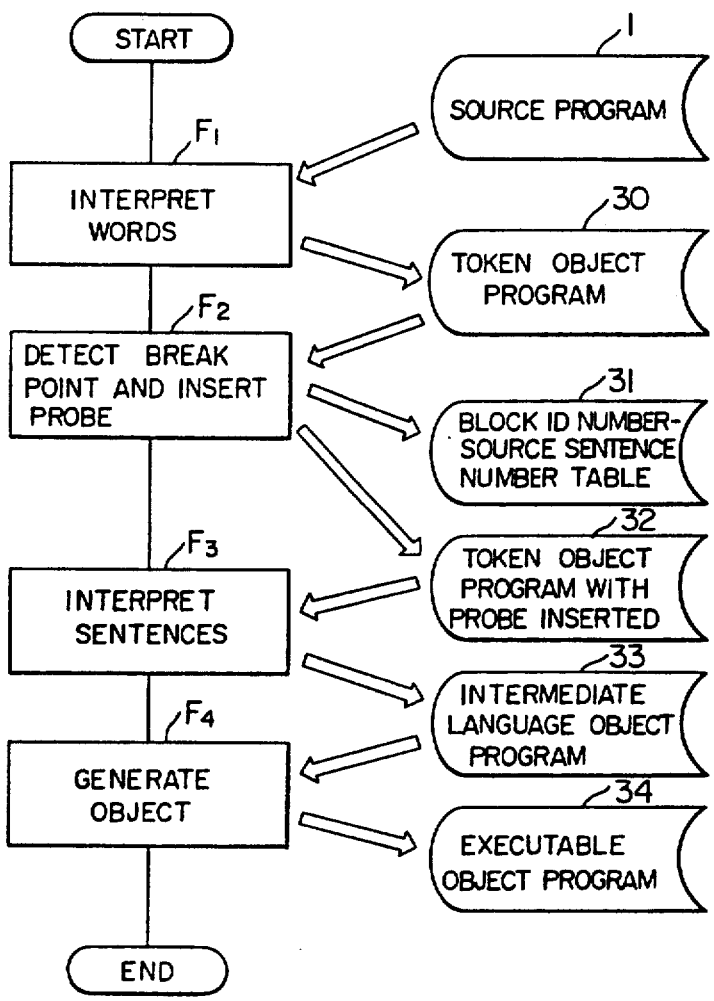
FIG. 7 shows a flow chart of an operation of a compiler.
Figure 8A:
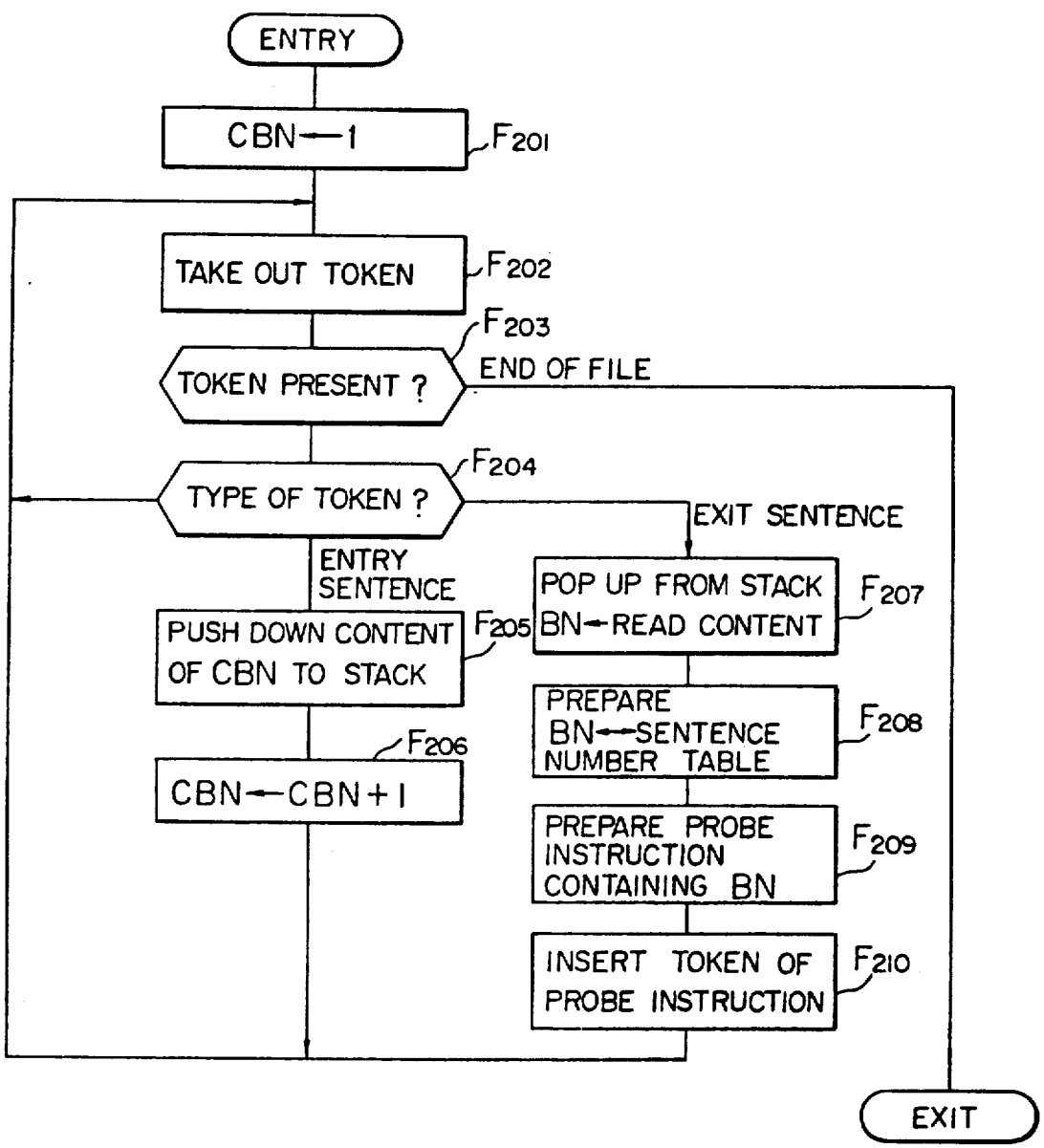
FIG. 8A shows a flow chart for inserting a PROBE instruction.
Figure 8B:
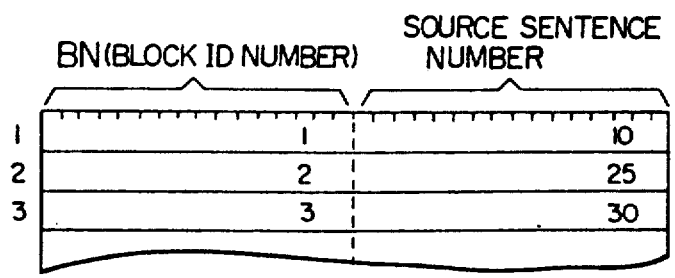
FIG. 8B shows a table prepared in the course of the insertion.

FIG. 7 shows a flow chart of the operation of the compiler unit 2. The source program described as a structured program is loaded from the auxiliary memory 1 into the compiler unit 2. The compiler unit 2 interprets the words of the source program (F1) and inserts the PROBE instruction (shown in FIG. 5c) for detecting the break point at the position of the exit sentence (or entry sentence) of each block identified by the word interpretation (F2). Then, the compiler unit 2 interprets the sentences (F3) as is done in a usual compiling process and generates an object program (F4) by compiling the source program to an executable object program 34. Numerals 30-33 denote programs and tables generated in the course of the compiling of the compiler unit 2. Characterizing features in the compiling of the present embodiment are the detection of the position of the exit sentence as the break point and the step F2 for inserting the PROBE instruction at that point. A detail of the step F2 is shown in FIGS. 8A and 8B. FIG. 8A shows a detailed flow of the step F2 of FIG. 7. Referring to FIG. 8A, a push-down stack (contained in the compiler unit 2) is used to detect the exit sentence at each block starting at the entry sentence and ending at the exit sentence and to insert the PROBE instruction thereat. In steps F201-F204, the instruction word is checked to determine if it is the entry sentence or the exit sentence, or not. If it is the entry sentence, steps F205 and F206 are carried out and the processing goes back to the step F202. If it is the exit sentence (that is, the break point of the program block), steps F207 and F208 are carried out to prepare a table as shown in FIG. 8B. In a step F209, the PROBE instruction which contains the block identification number (BN) in the operand field is prepared based on the table. In a step of F210, the PROBE instruction is inserted following the EXIT sentence.

In this manner, the PROBE instruction is inserted at the break point when the source program (described in the structured format) is compiled to the executable object program by the compiler unit 2. The resulting object program is stored into the main memory 3.

Figure 10:
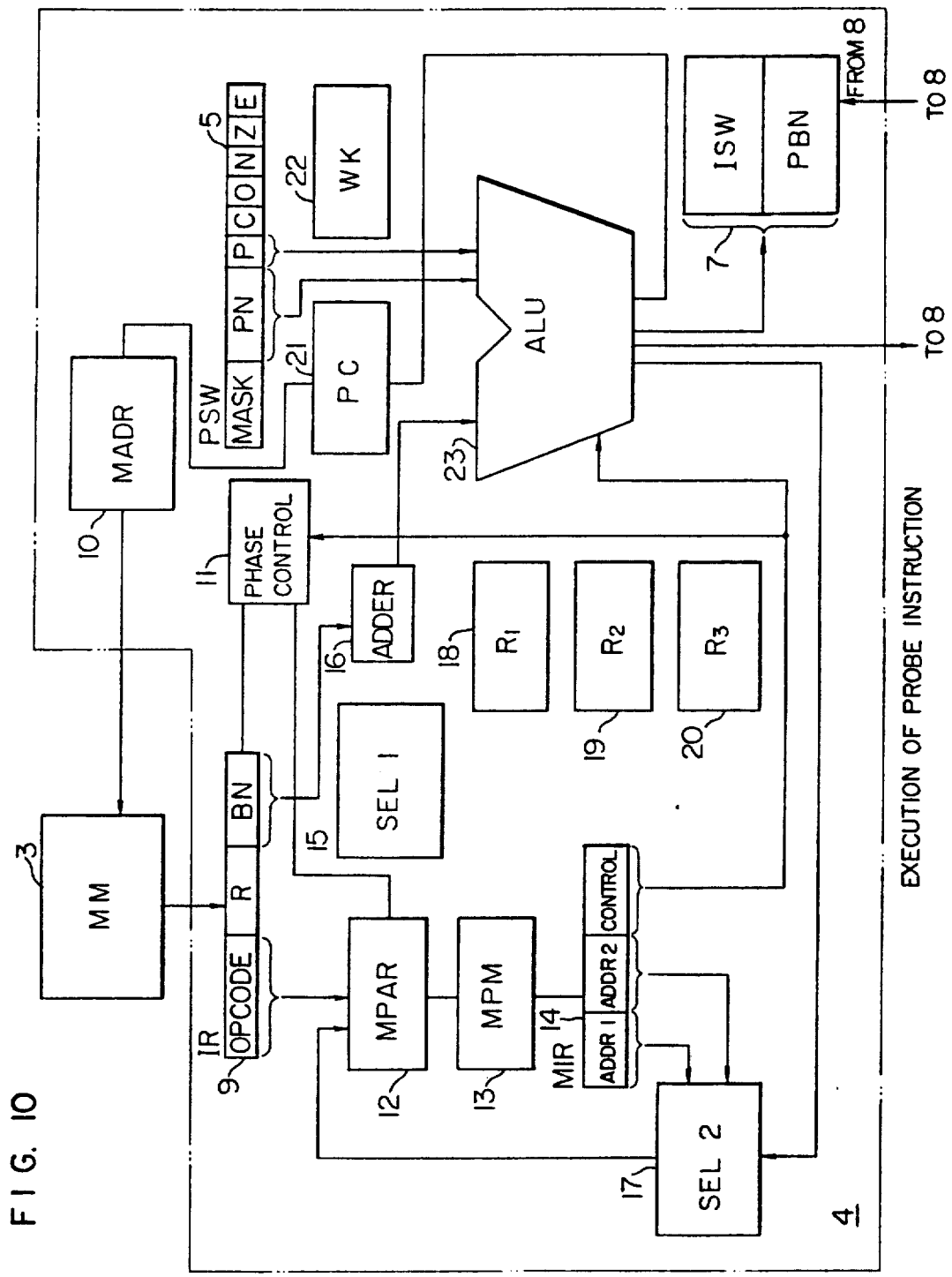

Next, a detail of the processing unit 4 of FIG. 6 will be explained. FIGS. 9 and 10 show detailed block diagrams. The processing unit 4 comprises the elements 5, 7, 9-25. Numeral 5 denotes the flag register and numeral 7 denotes the interrupt control information store. Numeral 9 denotes an instruction register (IR) to which an instruction word to be executed is fetched from the main memory 3. Numeral 10 denotes a memory address register (MADR) which registers therein an address on the main memory 3 at which an instruction to be fetched to the instruction register 9 is stored. Numeral 11 denotes a phase control circuit. Numeral 12 denotes a microprogram address register (MPAR) which registers therein the content of the operation code (OPCODE) field of the instruction word fetched to the instruction register 9. Numeral 13 denotes a microprogram memory (MPM) which stores therein microinstructions and supplies one of the microinstructions of the address specified by the content of the register 12. Numeral 14 denotes a microinstruction register (MIR) which registers therein the microinstruction supplied from the MPM 13. The microinstruction comprises an address field and a control field. The address field is supplied to the MPAR 12 to specify the address of the next microinstruction. The control field is supplied to an arithmetic logic unit (ALU) 23. Numeral 15 denotes a first selector which selects one of registers 18-20 depending on the content of the R field (register specifying field) of the instruction word fetched to the IR 9. Numeral 16 denotes an adder which sums the content of the A field (for specifying the address for which the instruction is executed) of the instruction word fetched to the IR 9 and the content of the register selected by the selector 15. Numeral 17 denotes a second selector which selects a first address field (Addr 1) or a second address field (Addr 2) of the address field of the MIR 14 and supplies the selected field to the MPAR 12. A select signal therefor is supplied from the ALU 23. Numerals 18-20 denote the registers, numeral 21 denotes a program counter for generating an address signal for executing the program, numeral 22 denotes a work register, numeral 23 denotes the ALU which carries out arithmetic and logic operation in accordance with the content of the IR 14, and numeral 25 denotes a condition code register.

FIG. 9 shows a functional construction of the processing unit 4 for executing the LOAD instruction, and FIG. 10 shows a functional construction of the processing unit 4 for executing the PROBE instruction. FIG. 9 is shown for the comparison with FIG. 10.

The operation of FIG. 9 is now explained. The instruction execution address specified by the program counter 21 is registered in the memory address register 10. Based on this address, the main memory 3 supplies the information (instruction word) at the corresponding address to the instruction register (IR) 9. Let us assume that the instruction word is the LOAD instruction. The OPCODE field of the IR 9 is registered in the MPAR 12, the content of which is used to address the MPM 13 which stores therein a microprogram so that the microprogram corresponding to that address is supplied to the MIR 14. The address field of the microinstruction registered in the MIR 14 is supplied to the MPAR 12 through the selector 17 and used to read out the next microinstruction. The control field of the microinstruction is supplied to the ALU 23. On the other hand, the data in the R field of the instruction word registered in the IR 9 is supplied to the selector 15 which selects one of the registers 18-20 and supplies the content thereof to the adder 16. The adder 16 adds the data supplied from the selector 15 to the data in the A field of the instruction word registered in the IR 9 to determine the address on the main memory 3 in which the information to be fetched is stored. The sum (address) is supplied to the MADR 10 so that the data at the corresponding address on the main memory 3 is registered in the work register (WR) 22. The ALU 23 stores the information registered in the WR 22 into the accumulator 24 based on the information in the control field of the microinstruction registered in the MIR 14. It also supplies a condition code to the condition code register 25 depending on the condition of the data. Thus, the condition code of the PSW 5 is set. Those operations are carried out under the control of a certain number of microinstructions.

FIG. 9 explains the execution of the LOAD instruction which is a typical example of ordinary operations. The ordinary operations are carried out in substantially same manner as that of FIG. 9.

Referring to FIG. 10, the execution of the PROBE instruction newly added in the present invention is now explained. The instruction word is first registered in the IR 9 as is done in FIG. 9. The OPCODE field of the instruction word (PROBE instruction in this case) registered in the IR 9 is supplied to the MPAR 12 and a microinstruction stored at the address of the MPM 13 corresponding to the data in the OPCODE field is supplied to the MIR 14 as is done in FIG. 9. Based on the microinstruction registered in the MIR 14, the ALU 23 first reads out the PROBE instruction execution flag P of the PSW (program status word) stored in the flag register 5 and checks if the flag P is "1" or "0". It is assumed that the PROBE instruction is executed when the flag P is not in the set state, that is, P="0", and the PROBE instruction is not executed when the flag P is in the set state, that is, P="1". If the flag P read by the ALU 23 is "1", the ALU 23 produces a signal to select the second address field Addr 2 of the microinstruction registered in the MIR 14. When the second address field Addr 2 is selected, the execution of the PROBE instruction terminates. If the flag P is "0", the ALU 23 supplies to the selector 17 a signal to select the first address field Addr 1 of the microinstruction.

Figure 11A:
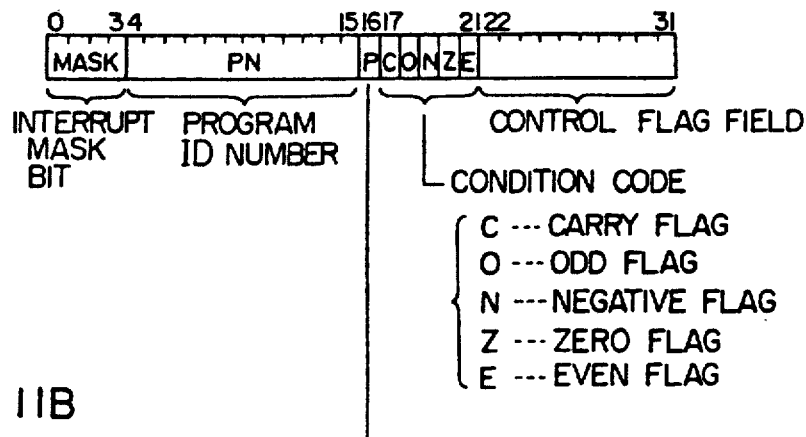
FIG. 11A shows a format of a program status word (PSW).

The program status word (PSW) is now explained. As shown in FIG. 11A, the PSW comprises an interrupt mask bit (MASK), a program identification number (PN), a PROBE instruction suppression flag (P), five condition codes (C, O, N, Z and E) and a control flag field.

Figure 11B:
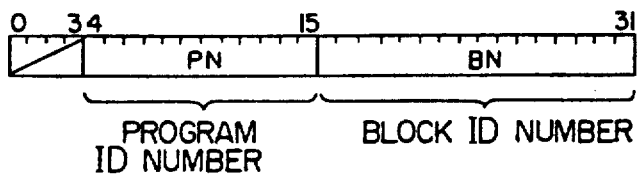
FIG. 11B shows a format of a program execution status data (PBN).

When the flag P is "0", the first address field Addr 1 is selected so that the execution status data collection operation is started by the PROBE instruction. The block identification number BN in the PROBE instruction registered in the IR 9 and the program identification number PN in the PSW (registered in the flag register 5) are combined in the ALU 23. The combined information is stored in the interrupt control information store 7 as the program execution path history information (execution status data) PBN. An example of the PBN is shown in FIG. 11B. The ALU 23 further responds to a microinstruction to set a start address of a data collecting program (stored in the main memory 3) into the PC 21 to start the collection of the program execution status data. The steps of the execution of the microinstruction thus far described are shown in a flow chart of FIG. 12.

Figure 14:
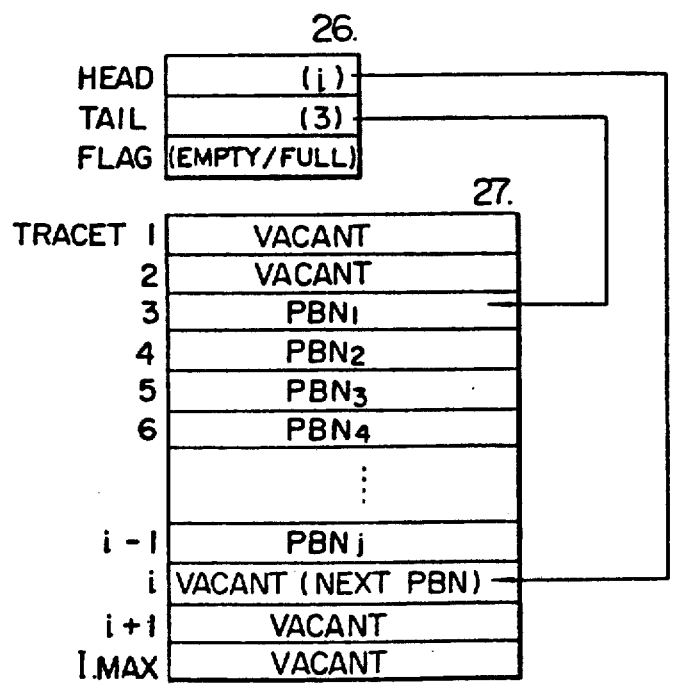
FIG. 14 shows a store table.
Figure 12:
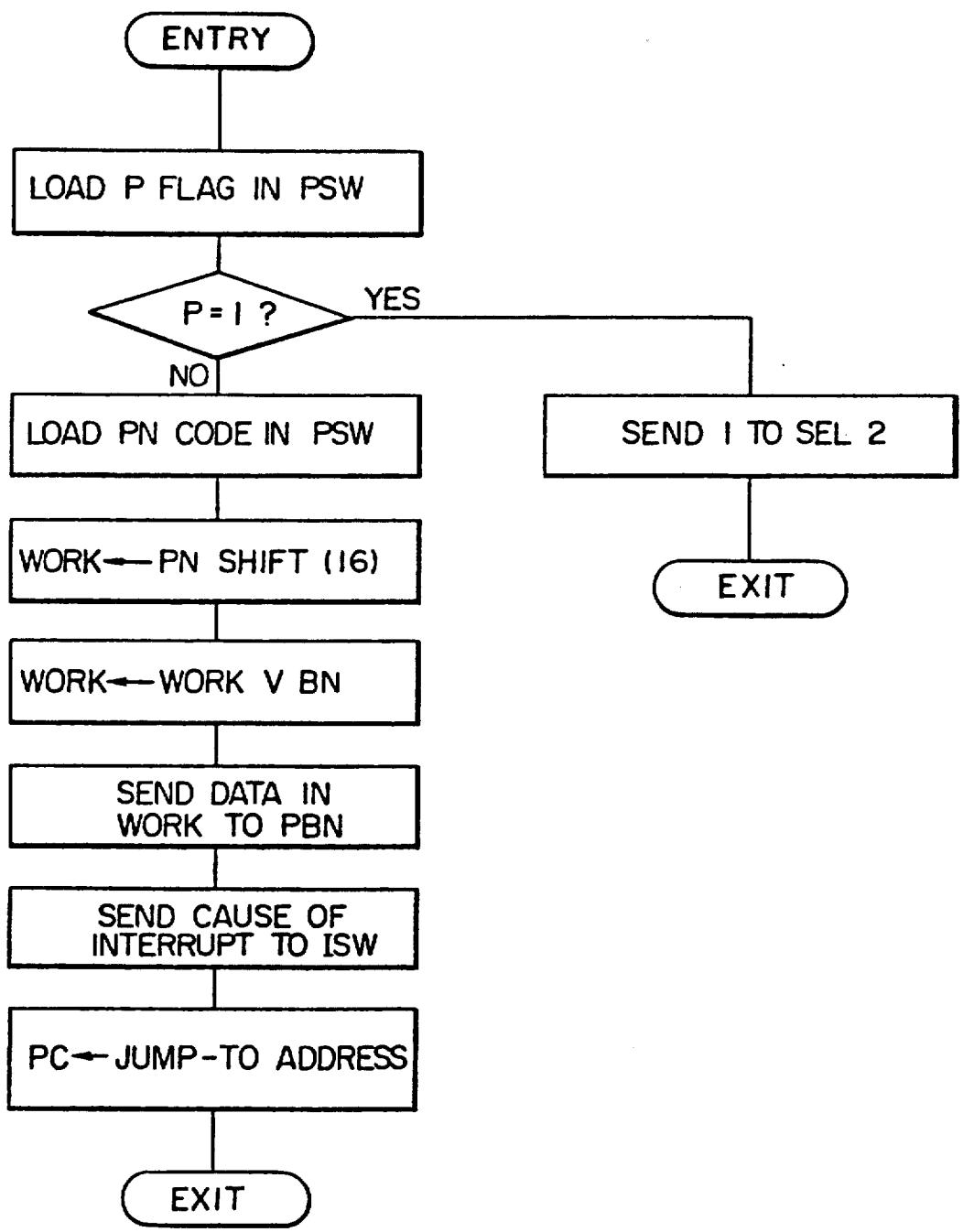
FIG. 12 shows a flow chart of a microinstruction started by the PROBE instruction.
Figure 13:
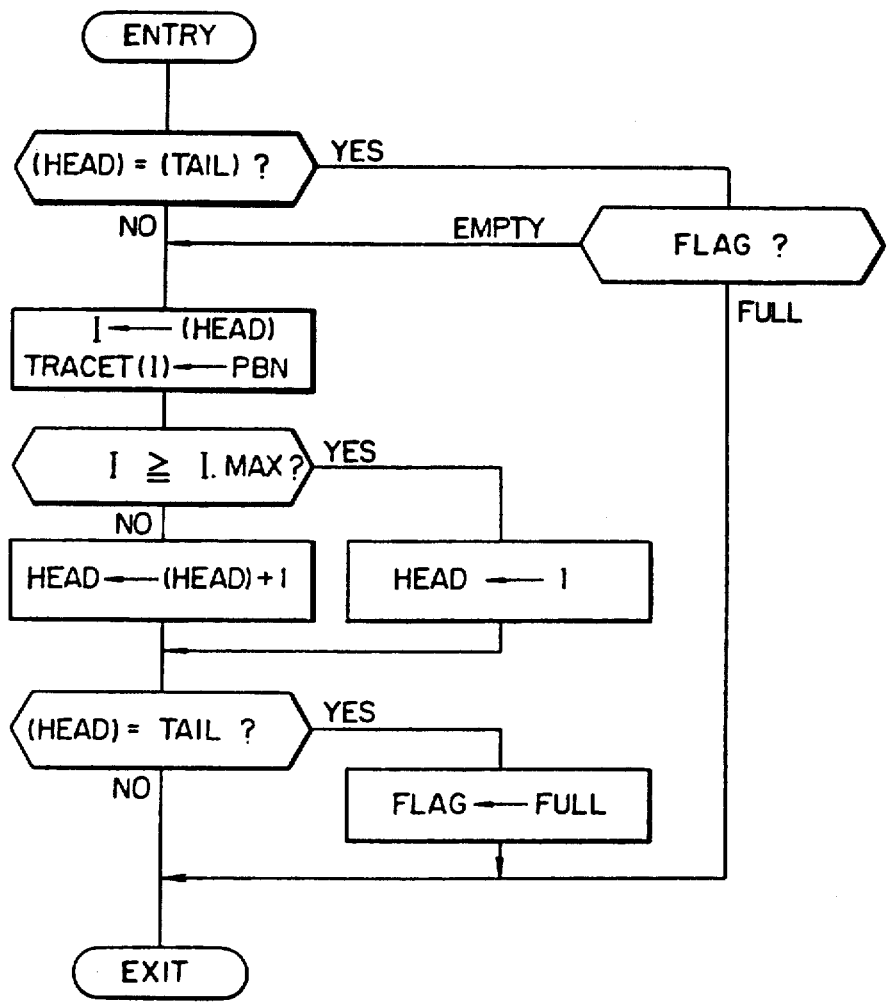
FIG. 13 shows a flow chart of a data collecting program.

The data collecting program for collecting the program execution status data is sequentially fetched from the main memory 3 and the steps shown in a flow chart of FIG. 13 is executed. The PBN stored in the interrupt control information store 7 by the execution of the PROBE instruction is stored into the program execution status data store table 8, which is shown in detail in FIG. 14. Referring to FIG. 14, numeral 26 denotes a managing unit and numeral 27 denotes a table. Under the control of a HEAD pointer and a TAIL pointer of the managing unit 26, the table 27 stores PBN therein in a first-in first-out manner, that is, in the order of execution. In this manner, the data on the program execution status is collected.

By analyzing the execution status data (execution path history data) thus collected, a particular block of a particular program that has been executed can be determined. By analyzing the sequentially collected data, the sequence of the execution of the blocks and the execution path can be determined. When the object program is executed in an on-line mode, the flag P of the PSW is set to "1" so that the PROBE instruction is skipped to eliminate the execution overhead. It should be understood that the execution status data in the on-line mode can be collected by setting the flag P to "0". This data is useful to investigate a cause of any error in the execution of the object program and facilitate the modification of the program.

The collection of the execution status data in the embodiment of the present invention is now explained with reference to FIGS. 15-17.

Figure 15A:
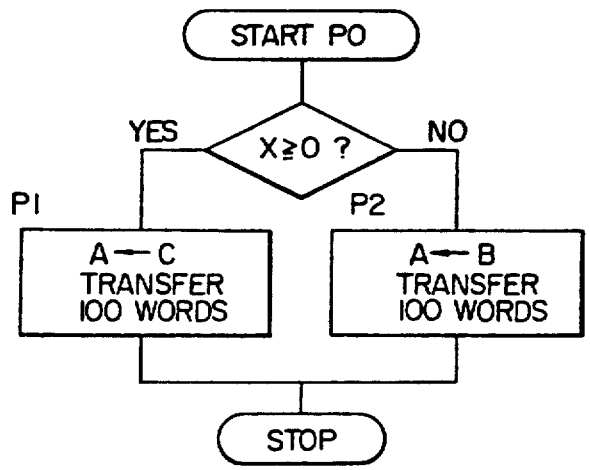
FIG. 15A shows a flow chart.
Figure 16:
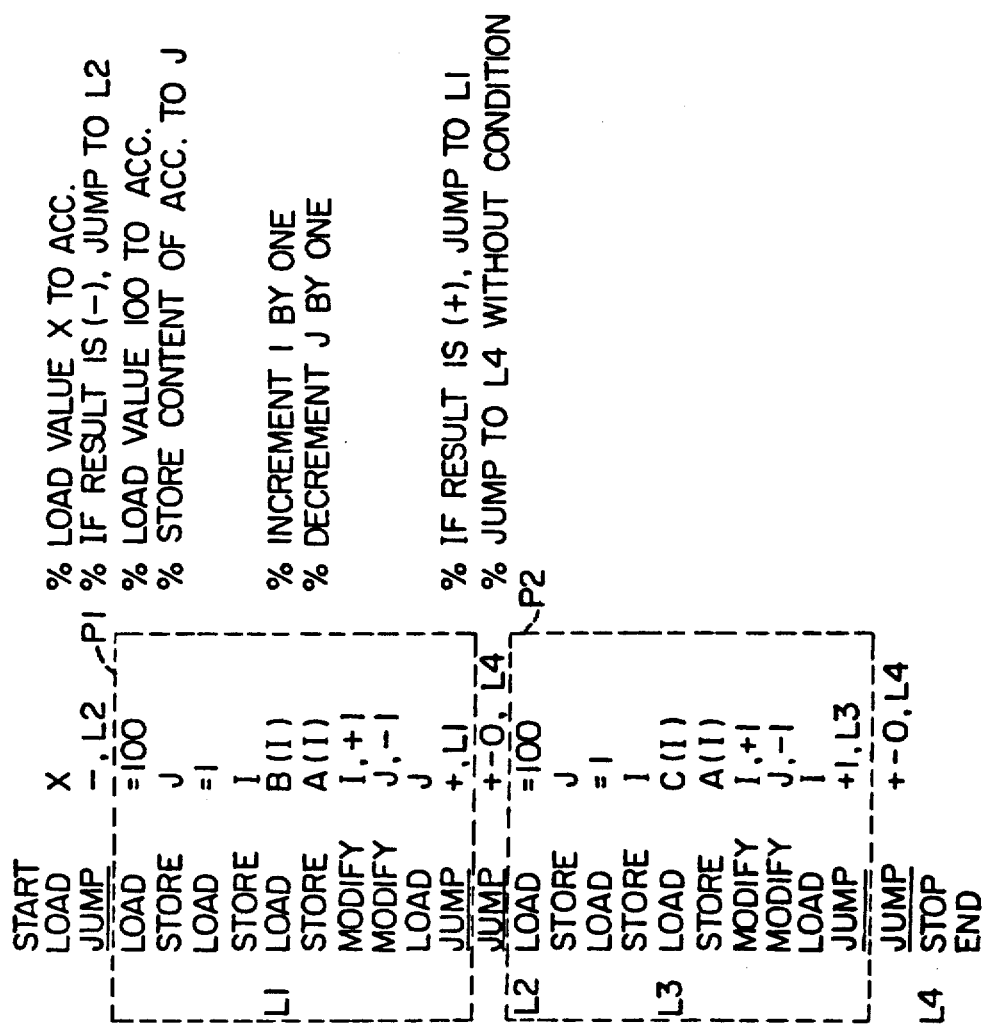
FIG. 16 shows an object program complied by a compiler unit.

FIG. 15A shows a flow chart of a logic of a program for a certain function, and FIG. 15B shows a structured program for the logic of FIG. 15A. The source program of FIG. 15B is compiled to an object program shown in FIG. 16 by a compiler program. (In FIG. 16, machine instructions are represented by store codes and the meanings thereof are described on the right). The logical structure of the program in this example is a block structure which includes two blocks $P_1$ and $P_2$ in the whole program $P_0$. In the past, the JUMP instruction in the object program shown in FIG. 16 has been used as the probe to trace the execution path. As a result, whether the block $P_1$ or the block $P_2$ is executed, the JUMP instructions are executed 102 times in the illustrated example during the execution of the program, and the execution path history data is collected for each JUMP instruction.

However, in order to analyze the execution path of the program, it is sufficient to collect the execution path history of at least the respective blocks of the program. Thus, as shown in FIG. 17, the machine instruction as PROBE is set at the exit of each block and when the machine instruction (PROBE) is executed, the block identification number or code is reported as the execution history data for that block. In this manner, only two trace steps are required. As seen from the above example, the larger the scale of the program is, the more is the overhead for the trace operation reduced.

While the machine instruction (PROBE) is set at the exit of each block in the illustrated embodiment, the same advantages are attained when it is set at the entry of each block.

As described hereinabove, according to the present invention, the execution path history data of the program can be collected with a minimum execution overhead and the logical execution path of the program can be readily analyzed.

We claim:

1. A method of collecting execution status data for a structured program consisting of a plurality of interconnected program blocks, each program block being closed between one entry sentence and one exit sentence, wherein a source program formed from interconnected program blocks of the structured program is loaded in a memory, the source program is read out and compiled by a compiler to form an object program, including an instruction word for starting a data collecting program for collecting execution status data of the source program formed from the interconnected program blocks of the structured program, the object program is executed, and the execution status data of the source program is collected during the execution of the object program, the method further comprising the steps of:

a) compiling the source program read out from the memory to form the object program, including (i) automatically detecting information in the form of an entry sentence or an exit sentence, which identifies each program block and separates that block from an adjacent program block, during a syntax analysis of the source program at the time it is being compiled, and (ii) inserting into said object program only at the location of said entry sentence or said exit sentence of said program block said instruction word for starting the data collecting program for collecting the execution status data, said instruction word including data for identifying said program block in an operand portion thereof;

b) executing the object program compiled in step (a);

c) interrupting the execution of the object program each time said instruction word is read out while said object program is being executed and starting said data collecting program; and d) storing in a store table the execution status data of the source program collected by the data collecting program.

2. A method of collecting execution status data for a structured program according to claim 1 wherein said data for identifying said program block is a block identification number.

3. Method for collecting execution status data for a structured program according to claim 1, wherein a flag of a program status word registered in a flag register for indicating execution or non-execution of the data collecting program is checked at the time said instruction word is read out, and said data collecting program is started only when said flag is not in a set state.

4. A method of collecting execution status data for a structured program according to claim 1 wherein the execution status data consists of a block identification number for identifying the program block containing said instruction word and a program number of said object program.

5. Method for collecting execution status data for a structured program according to claim 4, wherein a flag contained in a program status word for indicating execution or non-execution of the data collecting program is checked at the time said instruction word is read out, and said data collecting program is started only when said flag is not in the set state.

6. An apparatus for collecting execution status data for a structured program consisting of a plurality of interconnected program blocks, each program block being closed between at least one entry sentence and one exit sentence without a breakpoint which allows the program to be executed to jump out to or in from the outside of the block by skipping said entry sentence or said exit sentence, wherein a source program formed from the structured program is loaded in a memory, the source program is read out and compiled to form an object program, the object program is executed, and the data of the execution status of the object program is collected, comprising:

a compiler unit connected to the memory for compiling the source program read out from the memory to form the object program, said compiler unit including means for detecting information in the form of an entry sentence or an exit sentence for identifying each program block in said source program during a syntax analysis of the source program as it is being compiled and for inserting an instruction word for starting a data collecting program for collecting execution status data of the source program only into locations of said entry sentence or said exit sentence of said program block, said instruction word including data for identifying said program block in an operand portion thereof;

a main memory connected to said compiler for storing the object program so compiled and said data collecting program for collecting the execution status data of the object program; and a processing unit connected to said main memory for executing said object program, including means for interrupting execution of the object program when said instruction word is detected during the execution of the object program read out from the main memory and for starting the execution status data collecting program to store execution status data of the program block in which the instruction word.

7. An apparatus for collecting execution status data for a structured program according to claim 6 wherein said processing unit includes a register for storing a flag for indicating whether or not the execution of the instruction word is permitted and means for executing the instruction word when the flag stored in said register indicates that it is permitted to start the execution of said status data collecting program.

8. Apparatus for collecting execution status data for a structured program according to claim 6, wherein said instruction word contains therein a block identification number corresponding to the program block in which the instruction word is provided, said processing unit including a register for storing therein a program number of the object program being executed, and wherein said execution status data comprises said block identification number from said instruction word and said program number from said register.

9. A method of collecting execution status data for a structured program essentially consisting of a plurality of program blocks, each program block essentially consisting of only one entry sentence, only one exit sentence and a group of statements distinguished from other blocks in data processing of a source program formed from the structured program, each program block being interconnected only through said entry sentence and said exit sentence; wherein a source program formed from the structured program is loaded in a memory, the source program is read out and compiled to form an object program including an instruction word for starting a data collecting program for collecting execution status data of the source program formed from the structured program, the object program is executed, and the execution status data of the source program is collected during the execution of the object program, the method further comprising the steps of:

a) compiling the source program read out from the memory, including (i) detecting information in the form of an entry sentence or exit sentence which identifies each program block and separates that block from an adjacent program block during a syntax analysis of the source program to be compiled, and (ii) inserting only into said entry sentence or said exit sentence of said program block said instruction word for starting the data collecting program for collecting the execution status data, said instruction word including data for identifying said program block in an operand portion thereof, to subsequently form the object program;

b) interrupting the execution of the object program each time said instruction word is read out while said object program is being executed and starting said data collecting program; and c) storing said information in a store table as the execution status data of the source program by the data collecting program.

* * * * *